(12) United States Patent
Nakashima

(10) Patent No.: US 12,341,155 B2
(45) Date of Patent: Jun. 24, 2025

(54) SOLID-STATE BATTERY

(71) Applicant: Murata Manufacturing Co., Ltd., Nagaokakyo (JP)

(72) Inventor: Mamoru Nakashima, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 505 days.

(21) Appl. No.: 17/965,280

(22) Filed: Oct. 13, 2022

(65) Prior Publication Data

US 2023/0052507 A1    Feb. 16, 2023

Related U.S. Application Data

(63) Continuation of application No. PCT/JP2021/016595, filed on Apr. 26, 2021.

(30) Foreign Application Priority Data

Apr. 28, 2020 (JP) ................................. 2020-079423

(51) Int. Cl.
*H01M 10/0562* (2010.01)
*H01M 4/02* (2006.01)

(52) U.S. Cl.
CPC ......... *H01M 10/0562* (2013.01); *H01M 4/02* (2013.01); *H01M 2004/021* (2013.01)

(58) Field of Classification Search
CPC ..... H01M 10/0562; H01M 2300/0065; H01M 2300/0068; H01M 2300/0071;

(Continued)

(56) References Cited

U.S. PATENT DOCUMENTS

| 8,142,923 B2 | 3/2012 | Emura et al. |
| 2009/0191461 A1 | 7/2009 | Nakamura |

(Continued)

FOREIGN PATENT DOCUMENTS

| JP | 2008078109 A | 4/2008 |
| JP | 2008294298 A | 12/2008 |

(Continued)

OTHER PUBLICATIONS

JP2014127463 English translation. Kitaura. Japan. Jul. 7, 2014. (Year: 2014).*

(Continued)

*Primary Examiner* — Christopher P Domone
(74) *Attorney, Agent, or Firm* — ArentFox Schiff LLP

(57) ABSTRACT

A solid-state battery that includes one or more battery constituent units each including a positive electrode layer, a negative electrode layer, and a solid electrolyte layer interposed between the positive electrode layer and the negative electrode layer, in which the positive electrode layer and the negative electrode layer have a central portion and an outer edge portion surrounding the central portion in a plan view of the solid-state battery, and in at least one of the positive electrode layer and the negative electrode layer: 1.05≤ (maximum value of film thickness of outer edge portion)/ (average film thickness of central portion)<1.34 and (average film thickness of solid electrolyte layer)/(average film thickness of central portion)>0.35.

13 Claims, 3 Drawing Sheets

(58) Field of Classification Search
CPC . H01M 2300/0074; H01M 2300/0077; H01M 2300/008; H01M 2300/0082; H01M 2004/021

See application file for complete search history.

(56) References Cited

U.S. PATENT DOCUMENTS

| | | |
|---|---|---|
| 2009/0214957 A1 | 8/2009 | Okada et al. |
| 2010/0028775 A1 | 2/2010 | Emura et al. |
| 2013/0260245 A1* | 10/2013 | Kitagawa .............. H01M 4/131 |
| | | 429/231 |
| 2020/0067143 A1 | 2/2020 | Kato |

FOREIGN PATENT DOCUMENTS

| | | |
|---|---|---|
| JP | 2009224318 A | 10/2009 |
| JP | 2013054949 A | 3/2013 |
| JP | 2014049907 A | 3/2014 |
| JP | 2014127463 A | 7/2014 |
| WO | 2008/065900 A1 | 6/2008 |

OTHER PUBLICATIONS

International Search Report in PCT/JP2021/016595, mailed Jul. 20, 2021, 3 pages.

* cited by examiner

SOLID-STATE BATTERY

CROSS REFERENCE TO RELATED APPLICATIONS

The present application is a continuation of International application No. PCT/JP2021/016595, filed Apr. 26, 2021, which claims priority to Japanese Patent Application No. 2020-079423, filed Apr. 28, 2020, the entire contents of each of which are incorporated herein by reference.

FIELD OF THE INVENTION

The present invention relates to a solid-state battery.

BACKGROUND OF THE INVENTION

In recent years, the demand for batteries as power sources for portable electronic devices such as mobile phones and portable personal computers has been greatly expanded. In batteries used for such applications, an electrolyte (electrolytic solution) such as an organic solvent has been conventionally used as a medium for moving ions. However, in a battery having the above configuration, there is a risk that the electrolytic solution leaks. The organic solvent or the like used as the electrolytic solution is a combustible substance. Therefore, it is required to enhance the safety of the battery. Therefore, in order to enhance the safety of the battery, a solid-state battery employing a solid electrolyte as an electrolyte instead of an electrolytic solution has been studied.

For example, Patent Document 1 discloses that, in a solid-state battery having a plurality of electrode layers laminated with a solid electrolyte interposed therebetween, a variation in temperature distribution in an electrode surface can be suppressed by making the thickness of a region located on the central portion side of the electrode layer smaller than the thickness of a region located on the end portion side of the electrode layer.

Patent Document 1: Japanese Patent Application Laid-Open No. 2008-78109

SUMMARY OF THE INVENTION

In order to put the solid-state battery into practical use, it is necessary to reduce the internal resistance in order to improve the power density. As one method for reducing the internal resistance, it is conceivable to reduce the interval between the electrode layers. For example, in the method of Patent Document 1, since the thickness of the region located on the central portion side of the electrode layer is smaller than the thickness of the region located on the end portion side of the electrode layer, the interval between the electrode layers is reduced at the end portion, and the internal resistance can be reduced. However, there is a problem that a short circuit between electrode layers at the end portion easily occurs.

Therefore, an object of the present invention is to provide a solid-state battery in which the internal resistance can be reduced and in which a short circuit can be prevented.

In order to solve the above problems, a solid-state battery of the present invention includes one or more battery constituent units each including a positive electrode layer, a negative electrode layer, and a solid electrolyte layer interposed between the positive electrode layer and the negative electrode layer, in which the positive electrode layer and the negative electrode layer have a central portion and an outer edge portion surrounding the central portion in a plan view of the solid-state battery, and in at least one of the positive electrode layer and the negative electrode layer: $1.05 \leq$ (maximum value of film thickness of outer edge portion)/(average film thickness of central portion)$<1.34$ and (average film thickness of solid electrolyte layer)/(average film thickness of central portion)$>0.35$.

The present invention can provide a solid-state battery in which the internal resistance can be reduced and in which a short circuit can be prevented.

DETAILED DESCRIPTION OF THE INVENTION

Figure 1:
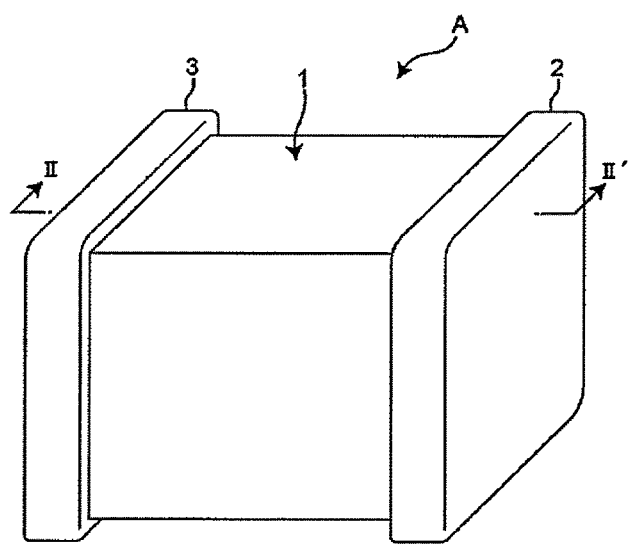
FIG. 1 is a schematic perspective view showing an example of a structure of a solid-state battery according to a first embodiment of the present invention.

The term "solid-state battery" used in the present invention refers to a battery whose constituent elements are constituted of solids in a broad sense, and refers to an all-solid-state battery whose constituent elements (particularly preferably all constituent elements) are constituted of solids in a narrow sense. In a preferred mode, the solid-state battery in the present invention is a laminated solid-state battery configured such that layers constituting a battery constituent unit are laminated on each other, and such layers are preferably composed of fired bodies. The "solid-state battery" includes not only what is called a "secondary battery" capable of repeating charging and discharging but also a "primary battery" capable of only discharging. In a preferred mode of the present invention, the "solid-state battery" is a secondary battery. The "secondary battery" is not excessively limited by its name and can include, for example, an electrochemical device such as a "power storage device".

The term "plan view" in the present specification refers to a state (a top view or a bottom view) when an object is viewed from above or below along a thickness direction based on a laminating direction of an electrode laminate constituting a solid-state battery. The term "sectional view" in the present specification refers to a sectional state (sectional view) when an object is viewed in a direction substantially perpendicular to a thickness direction based on a laminating direction of an electrode laminate constituting a solid-state battery. The "vertical direction" and the "lateral direction" used directly or indirectly in the present specification correspond to the vertical direction and the lateral direction in the drawings, respectively. Unless otherwise specified, the same reference numerals or symbols indicate the same members or portions or the same semantic contents.

First Embodiment

Figure 2:
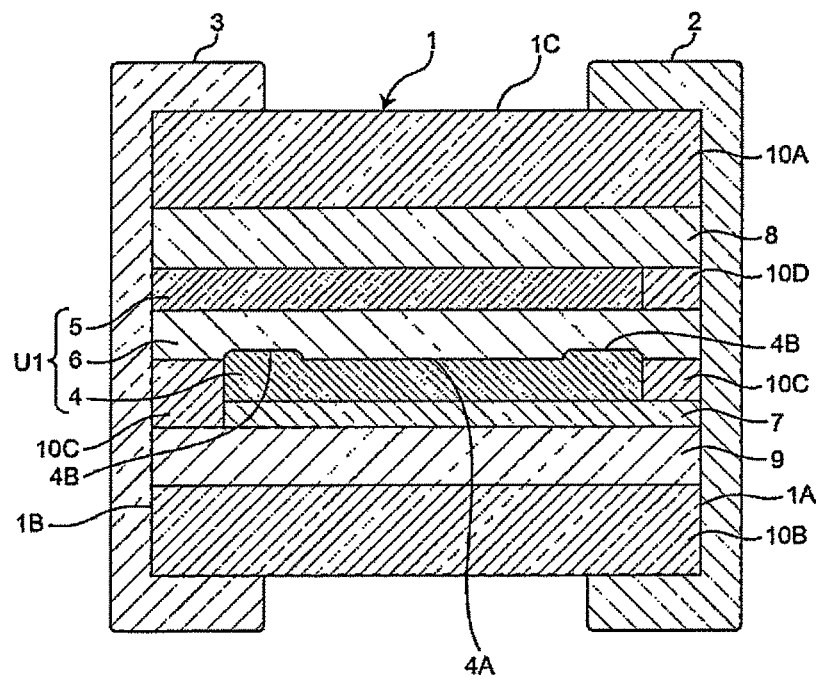
FIG. 2 is a schematic longitudinal sectional view taken along the line II-II' of the solid-state battery in FIG. 1.
Figure 3:
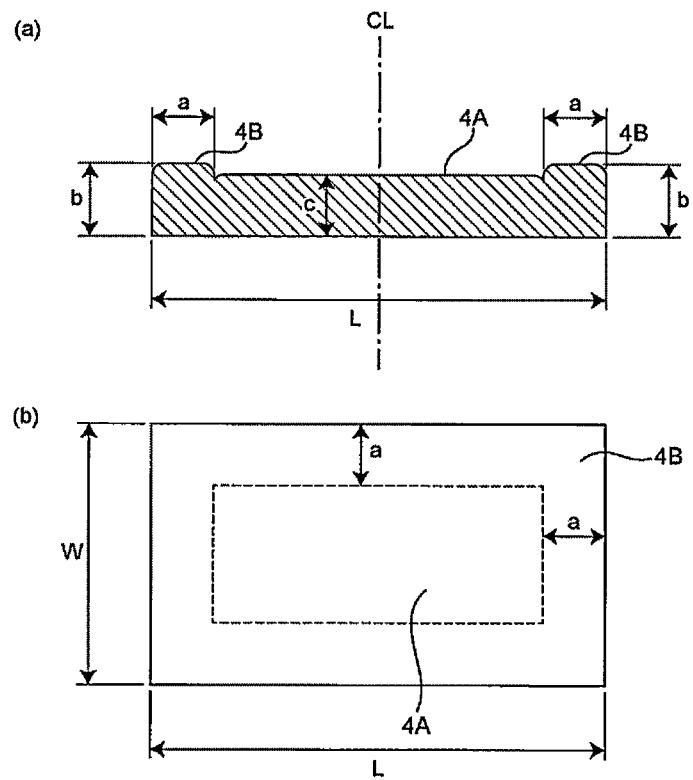
FIG. 3 includes a schematic sectional view and a schematic plan view showing an example of a structure of a positive electrode layer of the solid-state battery in FIG. 1.

A configuration of a solid-state battery A according to a mode of the present invention will be described with reference to FIGS. 1 to 3. The solid-state battery A includes a battery element 1 having a substantially rectangular shape and having a first end surface 1A and a second end surface 1B opposite to each other and a peripheral surface 1C located between the first end surface 1A and the second end surface 1B, a first external electrode 2 covering the first end surface 1A and the first end surface 1A side of the peripheral surface 1C, and a second external electrode 3 covering the second end surface 1B and the second end surface 1B side of the peripheral surface 1C.

[Configuration of Solid-State Battery]

The solid-state battery includes one or more battery constituent units that are electrode laminates including a plurality of electrode layers in which two types of electrode layers having different polarities, that is, positive electrode layers and negative electrode layers, are alternately laminated with solid electrolyte layers interposed therebetween, the battery constituent units each constituted of a positive electrode layer/a solid electrolyte layer/a negative electrode layer, and an intermediate layer and an exterior material as necessary (hereinafter the one or more battery constituent units are referred to as a battery element, and the battery element provided with the intermediate layer and the exterior material is referred to as a sheathed battery element). As shown in FIG. 2, the positive electrode layer 4 and the negative electrode layer 5 are extended in opposite directions to each other, exposed to the first end surface 1A and the second end surface 1B, respectively, and connected to the first external electrode 2 (positive electrode terminal) and the second external electrode 3 (negative electrode terminal), respectively. A current collector layer 7 is provided on the bottom surface of the positive electrode layer 4. Further, an intermediate layer 8 is provided on the upper surface of the negative electrode layer 5, which is the uppermost layer of a battery constituent unit U1, and an intermediate layer 9 is provided on the bottom surface of the current collector layer 7 of the positive electrode layer 4, which is the lowermost layer of the battery constituent unit. Further, an exterior material 10A is provided on the upper surface of the intermediate layer 8, and an exterior material 10B is provided on the bottom surface of the intermediate layer 9. Further, an exterior material 10D is provided between the protruding portion of the intermediate layer 8 covering the upper surface of the negative electrode layer 5 and the solid electrolyte layer 6 to protect the end surface of the negative electrode layer 5. Further, an exterior material 10C is provided between the protruding portion of the intermediate layer 9 covering the bottom surface of the current collector layer 7 and the solid electrolyte 6 to protect the end surface of the positive electrode layer 4 on the second end surface 1B side and the end surface of the current collector layer 7. Further, an exterior material 10C is provided between the protruding portion of the current collector layer 7 on the first end surface 1A side and the solid electrolyte 6 to protect the end surface of the positive electrode layer 4 on the first end surface 1A side. Although FIG. 2 illustrates an example in which the battery element 1 includes one battery constituent unit, the number of battery constituent units is not limited thereto.

(Electrode Layer)

The positive electrode layer and the negative electrode layer constituting the electrode layers each have a central portion and an outer edge portion surrounding the central portion in a plan view on the upper surface and/or the bottom surface. FIG. 3 includes a schematic sectional view and a schematic plan view showing an example of a structure of an electrode layer and shows the example of the positive electrode layer 4 in FIG. 2.

As will be described later, the solid-state battery can be manufactured using a printing method such as screen printing. The present inventors have focused on a phenomenon (high thickness at the end portions) in which an end portion (edge portion) of a coating layer bulges in a printing method in which an uncoated portion is provided at both end portions of a substrate using a screen or the like, to find that it is possible to reduce internal resistance and prevent a short circuit by controlling the thickness of the end portion. The electrode layer, such as the positive electrode layer 4 shown as an example, has a central portion 4A and an outer edge portion 4B that is a bulging region surrounding the central portion 4A on the upper surface. In other words, the outer edge portion 4B of the positive electrode layer 4 protrudes (bulges) toward the solid electrolyte layer 6 side with respect to the central portion 4A. Here, the central portion is a region including a virtual center line CL drawn in a direction orthogonal to the laminating direction of the battery constituent units and is a region surrounded by the outer edge portion. The edge portion of the coating layer has a rectangular sectional shape immediately after application but is deformed by being pressurized at the time of laminating to have a crushed sectional shape as shown in FIG. 3. When the length of the positive electrode layer 4 is L, a width a of the outer edge portion 4B is set such that a ratio a/L is in the range of 0.03 to 0.3, preferably 0.1 to 0.3. When the width of the positive electrode layer 4 is W, a ratio a/W is in the range of 0.03 to 0.3, preferably 0.1 to 0.3. For example, when the main surface of the electrode layer has a size of 8 mm×4 mm in a plan view, the width a of the outer edge portion 4B is about 1 mm. The outer edge portion 4B has a maximum film thickness b, and the central portion 4A has an average film thickness c.

In the present invention, in at least one electrode layer of the positive electrode layer and the negative electrode layer, the maximum value of the film thickness of the outer edge portion and the average film thickness of the central portion satisfy the following relationship:

1.05≤(maximum value of film thickness of outer edge portion)/(average film thickness of central portion)<1.34, and the average film thickness of the solid electrolyte layer and the average film thickness of the central portion of the electrode layer satisfy the following relationship:

(average film thickness of solid electrolyte layer)/ (average film thickness of central portion)>0.35.

As described above, in the printing method, since the end portion of the coating layer bulges, the maximum film thickness of the outer edge portion of the electrode layer becomes larger than the average film thickness of the central portion, and a short circuit (hereinafter also referred to as a short) between the electrode layers easily occurs. Therefore, from the viewpoint of preventing a short circuit, it is conceivable to reduce the bulging of the outer edge portion. However, reducing the bulging of the outer edge outer edge portion may result in an increase in the internal resistance. Therefore, in the present invention, from the viewpoint of achieving both internal resistance reduction and short circuit prevention, the relationship 1.05≤(maximum value of film thickness of outer edge portion)/(average film thickness of central portion)<1.34 is satisfied to reduce the internal resistance by reducing the interval between the electrode layers, and the relationship (average film thickness of solid electrolyte layer)/(average film thickness of central portion) >0.35 is satisfied to secure the film thickness of the solid electrolyte necessary for preventing the short circuit, whereby the short circuit is prevented.

Further, the average film thickness of the solid electrolyte layer, the average film thickness of the central portion of the electrode layer, and the maximum value of the film thickness of the outer edge portion of the electrode layer preferably satisfy the following relationship:

(average film thickness of solid electrolyte layer)−{(maximum value of film thickness of outer edge portion)−(average film thickness of central portion)}>0.

Further, the positive electrode layer and the negative electrode layer preferably satisfy the following relationship:

1.05≤(maximum value of film thickness of outer edge portion)/(average film thickness of central portion)<1.34.

The positive electrode layer and the negative electrode layer more preferably satisfy the following relationship:

1.05≤(maximum value of film thickness of outer edge portion)/(average film thickness of central portion)<1.2.

In the present invention, the average film thickness of the central portion refers to a value obtained by milling the electrode with an ion milling apparatus (ArBlade manufactured by Hitachi High-Technologies Corporation), photographing a stitched image of the central portion of the electrode with a scanning electron microscope (S-4700 manufactured by Hitachi, Ltd., acceleration voltage 3 kV, 1,000 times), taking 20 points at equal intervals from an end to the other end in the plane direction of the central portion, and calculating the average value of the thicknesses at the 20 points.

(Positive Electrode Layer)

The positive electrode layer contains a positive electrode active material and a solid electrolyte. The solid electrolyte may have a function as a binder. The positive electrode layer may further contain a conductive material as necessary.

The positive electrode active material contains, for example, a positive electrode material capable of occluding and releasing lithium ions or sodium ions, which are electrode reactants. From the viewpoint of obtaining a high energy density, the positive electrode material is preferably a lithium-containing compound, a sodium-containing compound, or the like but is not limited thereto. Examples thereof include at least one selected from the group consisting of a lithium-containing phosphate compound having a NASICON-type structure, a lithium-containing phosphate compound having an olivine-type structure, a lithium-containing layered oxide, a lithium-containing oxide having a spinel-type structure, and the like. Examples of the lithium-containing phosphate compound having a NASICON-type structure include $Li_3V_2(PO_4)_3$. Examples of the lithium-containing phosphate compound having an olivine-type structure include $Li_3Fe_2(PO_4)_3$, $LiFePO_4$, and/or $LiMnPO_4$. Examples of the lithium-containing layered oxide include $LiCoO_2$ and/or $LiCo_{1/3}Ni_{1/3}Mn_{1/3}O_2$. Examples of the lithium-containing oxide having a spinel-type structure include $LiMn_2O_4$ and/or $LiNi_{0.5}Mn_{1.5}O_4$.

Examples of the positive electrode active material capable of occluding and releasing sodium ions include at least one selected from the group consisting of a sodium-containing phosphate compound having a NASICON-type structure, a sodium-containing phosphate compound having an olivine-type structure, a sodium-containing layered oxide, a sodium-containing oxide having a spinel-type structure, and the like.

In addition, the positive electrode active material may be, for example, an oxide, a disulfide, a chalcogenide, a conductive polymer, or the like. Examples of the oxide include titanium oxide, vanadium oxide, and manganese dioxide. Examples of the disulfide include titanium disulfide and molybdenum sulfide. Examples of the chalcogenide include niobium selenide. Examples of the conductive polymer include disulfide, polypyrrole, polyaniline, polythiophene, poly-p-styrene, polyacetylene, and polyacene.

The solid electrolyte contained in the positive electrode layer preferably contains lithium- or sodium-containing oxide glass as an oxide-based inorganic solid electrolyte. The lithium- or sodium-containing oxide glass is preferably the same as the lithium- or sodium-containing oxide glass contained in the solid electrolyte layer. However, the components or compositions of the lithium- or sodium-containing oxide glass contained in the positive electrode layer and the solid electrolyte layer may be the same or different.

The conductive material is, for example, at least one of a carbon material, a metal, a metal oxide, a conductive polymer, and the like. As the carbon material, for example, at least one of graphite, carbon fiber, carbon black, carbon nanotubes, and the like can be used. As the carbon fiber, carbon black, and carbon nanotubes, for example, the same materials as those of the current collector layer for the positive electrode layer described later can be used. As the metal, for example, Ni powder or the like can be used. As the metal oxide, for example, $SnO_2$ or the like can be used. As the conductive polymer, for example, at least one of substituted or unsubstituted polyaniline, polypyrrole, polythiophene, a (co)polymer composed of one or two selected from these, and the like can be used. Note that the conductive material may be any material having conductivity and is not limited to the above examples.

The film thickness of the positive electrode layer may be 5 μm to 60 μm, preferably 8 μm to 50 μm. The thickness may be 5 μm to 30 μm.

The particle size of the positive electrode active material particles is not particularly limited, but the particle size is preferably small from the viewpoint of preventing a short circuit. However, when the particle size is too small, the electric resistance of the positive electrode layer increases. In particular, when the positive electrode layer contains a solid electrolyte, the solid electrolyte covers the positive electrode active material particles, thereby reducing the electron conduction path and increasing the electric resistance of the positive electrode layer. Therefore, the maximum particle size of the positive electrode active material particles is preferably 5 μm to 30 μm. The maximum particle size was determined by milling the positive electrode with an ion milling apparatus (ArBlade manufactured by Hitachi High-Technologies Corporation), observing the section of the cell with a scanning electron microscope (S-4700 manufactured by Hitachi, Ltd., acceleration voltage 3 kV), taking the longest part of each particle as the particle size, and taking the largest value of the particle size as the maximum particle size.

(Current Collector Layer for Positive Electrode Layer)

The current collector layer for the positive electrode layer may have the form of a foil but may have the form of a fired body from the viewpoints of reduction in manufacturing cost of the solid-state battery by integral firing and internal resistance of the solid-state battery. The current collector layer for the positive electrode layer may contain conductive particle powder and an inorganic binder. The conductive particles may include, for example, at least one of carbon particles and metal particles. As the carbon particles, for example, at least one of graphite, carbon fiber, carbon black, carbon nanotubes, and the like can be used. As the carbon fiber, for example, vapor growth carbon fiber (VGCF) or the like can be used. As the carbon black, for example, at least one of thermal black, furnace black, channel black, acetylene black, Ketjenblack, and the like can be used. As the carbon nanotubes, for example, single-walled carbon nanotubes (SWCNTs), multi-walled carbon nanotubes (MWCNTs) such as double-walled carbon nanotubes (DWCNTs), or the like can be used. As the metal particles, for example, Ni particles or the like can be used. However, the conductive particles are not particularly limited to those described above. The current collector layer for the positive electrode layer is not an essential element of the electrode layer.

The inorganic binder preferably contains lithium- or sodium-containing oxide glass. The lithium- or sodium-containing oxide glass has preferably been fired. The lithium- or sodium-containing oxide glass is preferably the same as the lithium- or sodium-containing oxide glass contained in the solid electrolyte layer. However, the components or compositions of the lithium- or sodium-containing oxide glass contained in the current collector layer and the solid electrolyte layer may be the same or different.

The current collector layer may be, for example, a metal layer containing Al, Ni, stainless steel, or the like. The shape of the metal layer may be, for example, a foil shape, a plate shape, a mesh shape, or the like.

(Negative Electrode Layer)

The negative electrode layer contains a negative electrode active material and a solid electrolyte. The solid electrolyte may have a function as a binder. The negative electrode layer may further contain a conductive material as necessary. A current collector layer may be provided on the negative electrode layer as necessary.

The negative electrode active material may contain, for example, a negative electrode material capable of occluding and releasing lithium ions or sodium ions, which are electrode reactants. From the viewpoint of obtaining a high energy density, the negative electrode material preferably contains at least one of a carbon material and a metal-based material but is not limited thereto. The negative electrode active material preferably has electrical conductivity. The negative electrode active material having such a function preferably contains a carbon material. From the viewpoint of obtaining high energy density and high electrical conductivity, the carbon material preferably contains at least one of graphite, acetylene black, Ketjenblack, and carbon fiber, and among these carbon materials, it is particularly preferable to contain graphite. The negative electrode layer may further contain a metal-based material as the conductive material. The negative electrode active material of the metal-based material may be, for example, a material containing, as a constituent element, a metal element or a semimetal element capable of forming an alloy with lithium or sodium. More specifically, for example, the metal-based material may be any one kind or two or more kinds of a simple substance, an alloy, or a compound of Ti (titanium), Si (silicon), Sn (tin), Cr (chromium), Fe (iron), Nb (niobium), Mo (molybdenum), Al (aluminum), In (indium), Mg (magnesium), B (boron), Ga (gallium), Ge (germanium), Pb (lead), Bi (bismuth), Cd (cadmium), Ag (silver), Zn (zinc), Hf (hafnium), Zr (zirconium), Y (yttrium), Pd (palladium), Pt (platinum), or the like. However, the simple substance is not limited to have a purity of 100% but may contain a trace amount of impurities. Examples of the alloy or compound include $SiB_4$, $TiSi_2$, SiC, $Si_3N_4$, $SiO_v$ ($0<v\leq2$), LiSiO, $SnO_w$ ($0<w\leq2$), $SnSiO_3$, LiSnO, and $Mg_2Sn$. Examples of the negative electrode active material contained in the negative electrode layer include at least one selected from the group consisting of a graphite-lithium compound, a lithium alloy, a lithium-containing phosphate compound having a NASICON-type structure, a lithium-containing phosphate compound having an olivine-type structure, a lithium-containing oxide having a spinel-type structure, and the like. Examples of the lithium alloy include Li—Al. Examples of the lithium-containing phosphate compound having a NASICON-type structure include $Li_3V_2(PO_4)_3$ and/or $LiTi_2(PO_4)_3$. Examples of the lithium-containing phosphate compound having an olivine-type structure include $Li_3Fe_2(PO_4)_3$ and/or $LiCuPO_4$. Examples of the lithium-containing oxide having a spinel-type structure include $Li_4Ti_5O_{12}$.

Examples of the negative electrode active material capable of occluding and releasing sodium ions include at least one selected from the group consisting of a sodium-containing phosphate compound having a NASICON-type structure, a sodium-containing phosphate compound having an olivine-type structure, a sodium-containing oxide having a spinel-type structure, and the like.

The solid electrolyte contained in the negative electrode layer preferably contains lithium-containing oxide glass as an oxide-based inorganic solid electrolyte. The lithium-containing oxide glass is preferably the same as the lithium-containing oxide glass contained in the solid electrolyte layer. However, the components or compositions of the lithium-containing oxide glass contained in the negative electrode layer and the solid electrolyte layer may be the same or different.

As the conductive material, the same conductive material as the conductive material contained in the above-described positive electrode layer can be used.

The film thickness of the negative electrode layer may be 5 μm to 60 μm, preferably 8 μm to 50 μm. The film thickness may be 5 μm to 30 μm.

(Solid Electrolyte Layer)

The solid electrolyte layer includes an oxide-based inorganic solid electrolyte. When the solid electrolyte layer contains the oxide-based inorganic solid electrolyte, the stability of the solid electrolyte layer against the atmosphere (moisture) can be improved. The oxide-based inorganic solid electrolyte preferably contains lithium- or sodium-containing oxide glass. Here, the glass refers to a material that is crystallographically amorphous: for example, a halo is observed in X-ray diffraction, electron beam diffraction, or the like. The oxide-based inorganic solid electrolyte has preferably been fired. This is because the strength and lithium ion conductivity or sodium ion conductivity of the solid electrolyte layer can be improved.

The lithium-containing oxide glass preferably contains at least one of Ge, Si, B, and P, Li, and O (oxygen) and more preferably contains Si, B, Li, and O. Specifically, those containing at least one of germanium oxide ($GeO_2$), silicon oxide ($SiO_2$), boron oxide ($B_2O_3$), and phosphorus oxide ($P_2O_5$) and lithium oxide ($Li_2O$) are preferable, and those containing $SiO_2$, $B_2O_3$, and $Li_2O$ are more preferable. The same applies to the sodium-containing oxide glass.

In addition, as a specific solid electrolyte, for example, a lithium-containing phosphate compound having a NASICON structure, an oxide having a perovskite structure, an oxide having a garnet-type or garnet-like structure, or the like may be used. Examples of the lithium-containing phosphate compound having a NASICON structure include $Li_xM_y(PO_4)_3$ ($1 \leq x \leq 2$, $1 \leq y \leq 2$, and M is at least one selected from the group consisting of Ti, Ge, Al, Ga, and Zr). Examples of the lithium-containing phosphate compound having a NASICON structure include $Li_{1.2}Al_{0.2}Ti_{1.8}(PO_4)_3$. Examples of the oxide having a perovskite structure include $La_{0.55}Li_{0.35}TiO_3$. Examples of the oxide having a garnet-type or garnet-like structure include $Li_7La_3Zr_2O_{12}$.

Examples of the solid electrolyte capable of conducting sodium ions include a sodium-containing phosphate compound having a NASICON structure, an oxide having a perovskite structure, and an oxide having a garnet-type or garnet-like structure. Examples of the sodium-containing phosphate compound having a NASICON structure include $Na_xM_y(PO_4)_3$ ($1 \leq x < 2$, $1 \leq y \leq 2$, and M is at least one selected from the group consisting of Ti, Ge, Al, Ga, and Zr).

The content of each of the oxides is the content of each of the oxides in the lithium-containing oxide glass, and specifically, the ratio of the content (mol) of each of the oxides to the total content (mol) of the oxides is expressed as a percentage (mol %). The content of each oxide can be measured using inductively coupled plasma atomic emission spectrometry (ICP-AES) or the like.

The film thickness of the solid electrolyte layer may be 1.8 μm to 21.0 μm, preferably 2.0 μm to 21.0 μm. The film thickness may be 1 μm to 5 μm.

(Exterior Material)

The exterior material can be generally formed on the outermost side of the solid-state battery and is for electrical, physical, and/or chemical protection. It is preferable that the exterior material be excellent in insulation property, durability, and/or moisture resistance and be environmentally safe. The exterior material may contain a ceramic powder and an inorganic binder.

The ceramic may contain at least one of a metal oxide, a metal nitride, and a metal carbide. Here, metals are defined as including semimetals. More specifically, the particles contain at least one of $Al_2O_3$ (aluminum oxide: alumina), $SiO_2$ (silicon oxide: quartz), SiN (silicon nitride), AlN (aluminum nitride), and SiC (silicon carbide). The particle powder may contain one kind of particles or two or more kinds of particles.

The inorganic binder preferably contains lithium-containing oxide glass. The lithium-containing oxide glass has preferably been fired. The lithium-containing oxide glass is preferably the same as the lithium-containing oxide glass contained in the solid electrolyte layer. However, the components or compositions of the lithium-containing oxide glass contained in the exterior material and the solid electrolyte layer may be the same or different.

(Positive Electrode Terminal and Negative Electrode Terminal)

The positive electrode terminal and the negative electrode terminal may contain, for example, conductive particle powder. The conductive particles may have been fired. The positive electrode terminal and the negative electrode terminal may further contain glass as an inorganic binder as necessary. The glass may have been fired.

Examples of the shape of the conductive particles include a spherical shape, an ellipsoid shape, a needle shape, a plate shape, a scale shape, a tube shape, a wire shape, a stick shape (rod shape), and an irregular shape but are not particularly limited thereto. Two or more kinds of particles having the above shapes may be used in combination.

The conductive particles may be metal particles, metal oxide particles, or carbon particles. Here, metals are defined as including semimetals. Examples of the metal particles include, but are not limited to, those containing at least one of Ag, Pt, Au, Ni, Cu, Pd, Al, and Fe.

Examples of the metal oxide particles include indium tin oxide (ITO), zinc oxide, indium oxide, antimony-added tin oxide, fluorine-added tin oxide, aluminum-added zinc oxide, gallium-added zinc oxide, silicon-added zinc oxide, zinc oxide-tin oxide type particles, indium oxide-tin oxide type particles, and zinc oxide-indium oxide-magnesium oxide type particles but are not limited thereto.

Examples of the carbon particles include, but are not limited to, carbon black, porous carbon, carbon fiber, fullerenes, graphene, carbon nanotubes, carbon microcoils, and nanohorns.

The glass includes, for example, oxide glass. The oxide glass is preferably the same as the oxide glass contained in the solid electrolyte layer. However, the components or compositions of the oxide glass contained in the positive and negative electrode terminals and the current collector layer may be the same or different.

(Intermediate Layer)

The intermediate layer may include a solid electrolyte. The solid electrolyte preferably contains lithium-containing oxide glass as an oxide-based inorganic solid electrolyte. The lithium-containing oxide glass is preferably the same as the lithium-containing oxide glass contained in the solid electrolyte layer. However, the components or compositions of the lithium-containing oxide glass contained in the intermediate layer and the solid electrolyte layer may be the same or different.

[Method for Manufacturing Solid-State Battery]

Subsequently, an example of a method for manufacturing the solid-state battery according to the present embodiment will be described. Although a solid-state battery capable of occluding and releasing lithium ions will be described as an example, a solid-state battery capable of occluding and releasing sodium ions may be used.

(Step of Producing Green Sheet for Producing Solid Electrolyte Layer)

First, lithium-containing oxide glass as an oxide-based inorganic solid electrolyte and an organic binder are mixed to prepare a mixture powder, and then the mixture powder is dispersed in a solvent to produce a paste for producing a solid electrolyte layer.

As the organic binder, for example, a polymer binder such as an acrylic resin can be used. The solvent is not particularly limited as long as it can disperse the mixture powder, but a solvent that is burned off in a temperature range lower than the glass transition temperature of the lithium-containing oxide glass contained in the paste for producing a solid electrolyte layer is preferable. As the solvent, for example, lower alcohols having 4 or less carbon atoms such as methanol, ethanol, isopropanol, n-butanol, sec-butanol, and t-butanol, aliphatic glycols such as ethylene glycol, propylene glycol (1,2-propanediol), 1,3-propanediol, 1,4-butanediol, 1,2-butanediol, 1,3-butanediol, and 2-methyl-1,3-propanediol, ketones such as methyl ethyl ketone, amines such as dimethylethylamine, alicyclic alcohols such as terpineol, and/or butyl acetate can be used singly or in combination of two or more thereof, but the solvent is not particularly limited thereto. Examples of the dispersion method include stirring treatment, ultrasonic dispersion treatment, bead dispersion treatment, kneading treatment, and homogenizer treatment. Examples of the organic binders and the solvents used in the steps of producing the respective pastes described below include the same materials as those of the paste for producing a solid electrolyte layer.

Next, a paste layer is formed by uniformly applying an electrolyte paste to the surface of a supporting substrate. As the supporting substrate, for example, a polymer resin film such as a polyethylene terephthalate (PET) film can be used. Here, application is defined as including printing. As the application method, for example, a die coating method, a microgravure coating method, a wire bar coating method, a direct gravure coating method, a reverse roll coating method, a comma coating method, a knife coating method, a spray coating method, a curtain coating method, a dip method, a spin coating method, a relief printing method, an offset printing method, a gravure printing method, an intaglio printing method, a rubber plate printing method, a screen printing method, or the like can be used, but the application method is not particularly limited to these methods.

In order to make it easy to peel a green sheet for producing a solid electrolyte layer from the surface of the supporting substrate in the subsequent step, it is preferable to perform a release treatment on the surface of the supporting substrate in advance. Examples of the release treatment include a method in which a composition for imparting a release property is applied on the surface of the supporting substrate or in which printing with the composition is performed in advance. Examples of the composition that imparts the release property include a coating material containing a binder as a main component and containing wax, fluorine, or the like added, and a silicone resin.

Next, the paste layer is dried to produce a green sheet for producing a solid electrolyte layer as a solid electrolyte layer precursor on the supporting substrate. Examples of the drying method include natural drying, air blow drying with hot air or the like, heat drying with infrared rays, far infrared rays, or the like, and vacuum drying. These drying methods may be used singly or in combination of two or more.

(Step of Producing Paste for Producing Positive Electrode Layer)

First, a positive electrode active material, lithium-containing oxide glass as the oxide-based inorganic solid electrolyte, an organic binder, and a conductive material as necessary are mixed to prepare a mixture powder, and then the mixture powder is dispersed in a solvent to produce a paste for producing a positive electrode layer.

(Step of Producing Paste for Producing Negative Electrode Layer)

First, a negative electrode active material, lithium-containing oxide glass as the oxide-based inorganic solid electrolyte, an organic binder, and a conductive material as necessary are mixed to prepare a mixture powder, and then the mixture powder is dispersed in a solvent to produce a paste for producing a negative electrode layer.

(Step of Producing Paste for Producing Positive Electrode Current Collector Layer)

First, conductive particles, lithium-containing oxide glass as an oxide-based inorganic solid electrolyte, and an organic binder are mixed to prepare a mixture powder, and then the mixture powder is dispersed in a solvent to produce a paste for producing a positive electrode current collector layer.

(Production of Paste for Producing Exterior Material)

First, alumina, lithium-containing oxide glass as an oxide-based inorganic solid electrolyte, and an organic binder are mixed to prepare a mixture powder, and then the mixture powder is dispersed in a solvent to produce a paste for producing an exterior material.

(Production of Green Sheet for Producing Positive Electrode Layer)

Printing with the paste for producing a positive electrode current collector layer was performed on a main surface of a green sheet for producing an intermediate layer to form a positive electrode current collector layer paste layer, and then printing with the paste for producing an exterior material was performed on an unapplied portion around the positive electrode current collector layer paste layer.

Next, printing with the paste for producing a positive electrode layer is performed on the positive electrode current collecting paste layer, and printing with the paste for producing an exterior material is performed around the positive electrode paste layer to produce a green sheet for producing a positive electrode layer.

(Production of Green Sheet for Producing Negative Electrode Layer)

Printing with the paste for producing a negative electrode layer is performed on a main surface of the green sheet for producing a solid electrolyte layer to form a negative electrode paste layer, and then printing with the paste for producing an exterior material is performed on an unapplied portion around the negative electrode paste layer to produce a green sheet for producing a negative electrode layer.

(Step of Producing Green Sheet for Producing Exterior Material)

First, a ceramic powder, an organic binder, and a particle powder as necessary are mixed to prepare a mixture powder, and then the mixture powder is dispersed in a solvent to produce a paste for producing an exterior material.

Next, a green sheet for producing an exterior material as an exterior material precursor is produced on the supporting substrate in the same manner as in the "Step of Producing Green Sheet for Producing Solid Electrolyte Layer" section described above except that the paste for producing an exterior material is used.

(Step of Producing Green Sheet for Producing Intermediate Layer)

First, lithium-containing oxide glass as an oxide-based inorganic solid electrolyte and an organic binder are mixed to prepare a mixture powder, and then the mixture powder is dispersed in a solvent to produce a paste for producing an intermediate layer.

Next, a green sheet for producing an intermediate layer as an intermediate layer precursor is produced on the supporting substrate in the same manner as in the "Step of Producing Green Sheet for Producing Solid Electrolyte Layer" section described above except that the paste for producing an intermediate layer is used.

(Step of Producing Conductive Paste)

A conductive particle powder, an organic binder, and oxide glass as an inorganic binder as necessary are mixed to prepare a mixture powder, and then the mixture powder is dispersed in a solvent to produce a conductive paste for producing a positive electrode terminal and a negative electrode terminal.

(Step of Producing Battery Element)

First, the supporting substrates of the green sheet for producing a positive electrode layer and the green sheet for producing a negative electrode layer were peeled off, the green sheets were laminated so that the surface of the positive electrode layer of the green sheet for producing a positive electrode layer was in contact with the surface of the electrolyte layer of the green sheet for producing a negative electrode layer, the green sheets for producing an intermediate layer were laminated on the outside thereof, and the green sheets for producing an exterior material were disposed on the green sheets for producing an intermediate layer, respectively.

Next, each green sheet constituting the laminate is pressure-bonded. Examples of the pressure bonding method include a cold isostatic press (CIP) method, a hot press method, and a warm isostatic press (WIP) method. Subsequently, the binder contained in each green sheet constituting the laminate is burned (degreased) by heating the laminate. Thereafter, the oxide glass contained in each green sheet constituting the laminate is heated and fired by firing the laminate. A sheathed battery element is thus obtained.

The oxide glass contained in the respective green sheets constituting the laminate preferably has the same or substantially the same glass transition temperature. In this case, since the oxide glass contained in the respective green sheets constituting the laminate can be fired at the same temperature or substantially the same temperature, the oxide glass contained in the respective green sheets constituting the laminate can be fired simultaneously or substantially simultaneously. Therefore, the production process of the battery can be simplified.

(Step of Producing Terminal)

First, each of the first end surface and the second end surface of the sheathed battery element is dipped into the conductive paste. Thereafter, the sheathed battery element is fired to fire the conductive particles contained in the conductive paste. As described above, a target battery is obtained.

Second Embodiment

In the first embodiment, an example in which the positive electrode layer has the central portion and the outer edge portion has been described, but in the present invention, the negative electrode layer may have a central portion and an outer edge portion.

Figure 4:
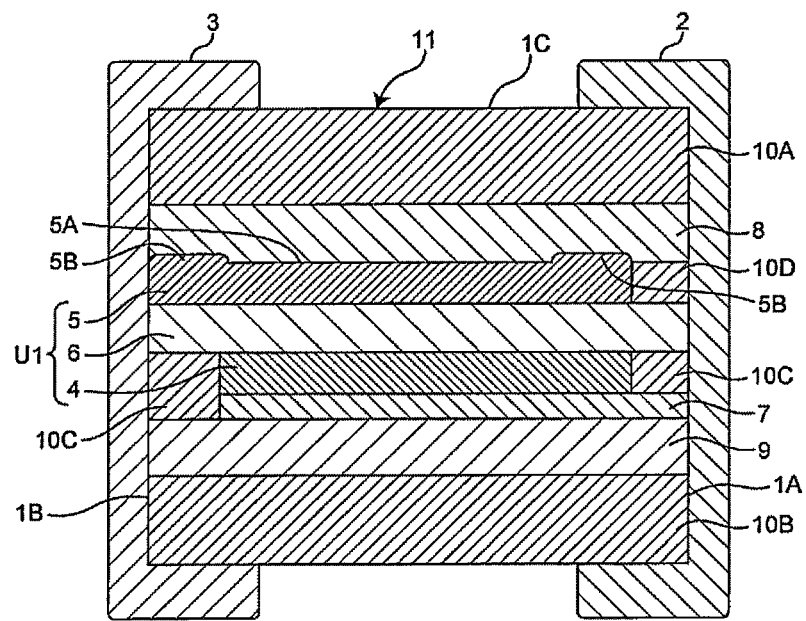
FIG. 4 is a schematic sectional view showing an example of a structure of a solid-state battery according to a second embodiment of the present invention.

FIG. 4 is a schematic sectional view showing an example of a structure of electrode layers of a solid-state battery according to the present embodiment, which has the same structure as that of the first embodiment except that the negative electrode layer has a central portion and an outer edge portion. The negative electrode layer 5 shown as an example has a central portion 5A and an outer edge portion 5B that is a bulging region surrounding the central portion 5A on the upper surface. Here, (the average film thickness of the solid electrolyte layer) and (the average film thickness of the central portion) are preferably substantially equal. In other words, (average film thickness of solid electrolyte layer)/(average film thickness of central portion)≈1 may be satisfied. Note that "equal" used in the present specification is intended to include an error of ±10%, and in the present embodiment, 0.9≤(average film thickness of solid electrolyte layer)/(average film thickness of central portion)≤1.1 may be included. When the length of the negative electrode layer 5 is L, a width a of the outer edge portion 5B is set such that a ratio a/L is in the range of 0.03 to 0.3, preferably 0.1 to 0.3. When the width of the negative electrode layer 5 is W, a ratio a/W is in the range of 0.03 to 0.3, preferably 0.1 to 0.3. For example, when the main surface of the electrode layer has a size of 8 mm×4 mm in a plan view, the width a of the outer edge portion 5B is about 1 mm. The outer edge portion 5B has a maximum film thickness b, and the central portion 5A has an average film thickness c.

Also in the present embodiment, as in the case of the first embodiment, regarding the production of the negative electrode layer, the edge portion of the coating layer has a rectangular sectional shape immediately after coating but is deformed to have a crushed sectional shape by being pressurized at the time of laminating, so that the outer edge portion is formed.

Also in the present embodiment, in the negative electrode layer, the maximum value of the film thickness of the outer edge portion and the average film thickness of the central portion satisfy the following relationship: 1.05≤(maximum value of film thickness of outer edge portion)/(average film thickness of central portion)<1.34, and the average film thickness of the solid electrolyte layer and the average film thickness of the central portion of the negative electrode layer satisfy the following relationship: (average film thickness of solid electrolyte layer)/(average film thickness of central portion)>0.35, so that both reduction in internal resistance and prevention of a short circuit can be achieved.

Third Embodiment

In the first embodiment, an example in which the positive electrode layer has the central portion and the outer edge portion has been described, but in the present invention, both the positive electrode layer and the negative electrode layer may each have a central portion and an outer edge portion.

Figure 5:
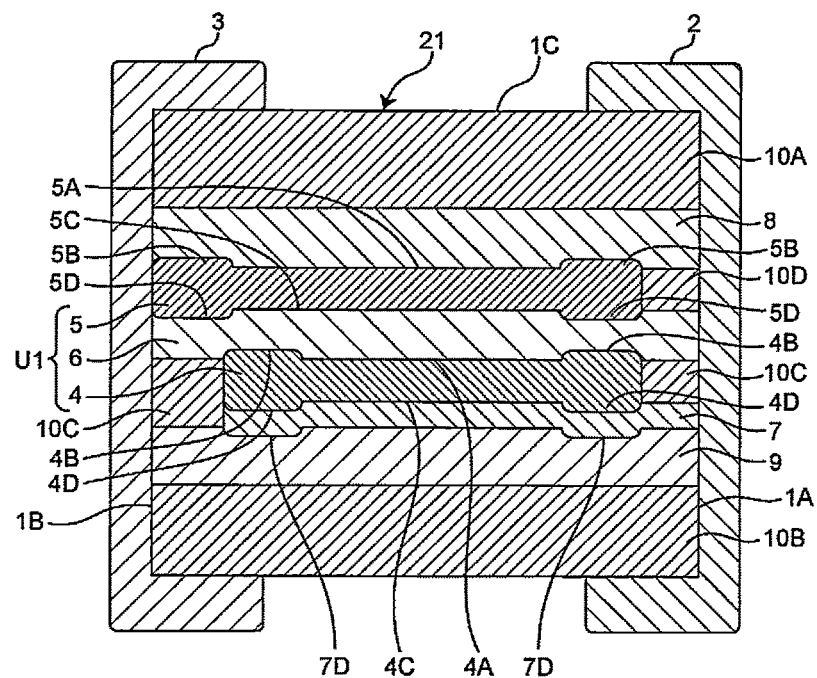
FIG. 5 is a schematic sectional view showing an example of a structure of a solid-state battery according to a third embodiment of the present invention.

FIG. 5 is a schematic sectional view showing an example of a structure of electrode layers of a solid-state battery C according to the present embodiment, which has the same structure as that of the first embodiment except that both the positive electrode layer and the negative electrode layer each have a central portion and an outer edge portion. The negative electrode layer 5 shown as an example has the central portion 5A and the outer edge portion 5B that is a bulging region surrounding the central portion 5A on the upper surface and also has a central portion 5C and an outer edge portion 5D that is a bulging region surrounding the central portion 5C on the bottom surface. In other words, the outer edge portion 5B of the negative electrode layer 5 protrudes (bulges) toward the solid electrolyte layer 6 with respect to the central portion 5A, and the outer edge portion 5D of the negative electrode layer 5 protrudes (bulges) toward the side opposite to the solid electrolyte layer 6 with respect to the central portion 5A. The positive electrode layer 4 shown as an example has the central portion 4A and the outer edge portion 4B that is a bulging region surrounding the central portion 4A on the upper surface and also has a central portion 4C and an outer edge portion 4D that is a bulging region surrounding the central portion 4C on the bottom surface. In other words, the outer edge portion 4B of the positive electrode layer 4 protrudes (bulges) toward the solid electrolyte layer 6 with respect to the central portion 4A, and the outer edge portion 4D of the positive electrode layer 4 protrudes (bulges) toward the side opposite to the solid electrolyte layer 6 in the laminating direction with respect to the central portion 4A of the positive electrode layer. In addition, by being pushed by the outer edge portion 4B of the positive electrode layer 4, a projecting portion 7D protruding to the intermediate layer 9 is also formed in a portion immediately below the outer edge portion 4B in the current collector layer 7. When the intermediate layer is the same glass electrolyte as the solid electrolyte layer, the solid electrolyte layer and the intermediate layer are softened to the same extent during firing, so that the outer edge portions of both the upper surfaces and the bottom surfaces of the positive electrode layer and the negative electrode layer have bulging projecting shapes. Therefore, the distance between the outer edge portions (4B and 5D) of the positive electrode layer 4 and the negative electrode layer 5 becomes short by the protruding amounts of the outer edge portions, so that the internal resistance is reduced.

When the length of the negative electrode layer 5 is L, the width a of the outer edge portions 5B and 5D of the negative electrode layer 5 is set such that the ratio a/L is in the range of 0.03 to 0.3, preferably 0.1 to 0.3. When the width of the negative electrode layer 5 is W, a ratio a/W is in the range of 0.03 to 0.3, preferably 0.1 to 0.3. For example, when the main surface of the electrode layer has a size of 8 mm×4 mm in a plan view, the width a of the outer edge portions 5B and 5D is about 1 mm. In addition, the outer edge portion 5B and the outer edge portion 5D have the common maximum film thickness b, and the central portion 5A and the central portion 5C have the common average film thickness c. Similarly, when the length of the positive electrode layer 4 is L, the width a of the outer edge portions 4B and 4D of the positive electrode layer 4 is set such that the ratio a/L is in the range of 0.03 to 0.3, preferably 0.1 to 0.3. When the width of the positive electrode layer 4 is W, a ratio a/W is in the range of 0.03 to 0.3, preferably 0.1 to 0.3.

Also in the present embodiment, as in the case of the first embodiment, the edge portion of the coating layer has a rectangular sectional shape immediately after coating but is deformed to have a crushed sectional shape by being pressurized at the time of laminating, so that the outer edge portions are formed at both ends of the upper surface and the bottom surface of each of the positive electrode layer and the negative electrode layer.

Also in the present embodiment, in the positive electrode layer and the negative electrode layer, the maximum value of the film thickness of the outer edge portion and the average film thickness of the central portion satisfy the following relationship: 1.05≤(maximum value of film thickness of outer edge portion)/(average film thickness of central portion)<1.34, and the average film thickness of the solid electrolyte layer and the average film thickness of the central portions of the positive electrode layer and the negative electrode layer satisfy the following relationship: (average film thickness of solid electrolyte layer)/(average film thickness of central portion)>0.35, so that both reduction in internal resistance and prevention of a short circuit can be achieved.

EXAMPLES

The present invention will be described in more detail with reference to the following examples, but the present invention is not limited to the following examples.

Example 1

In the present example, a battery having the configuration shown in FIG. 5 was produced as follows.

(Production of Green Sheet for Producing Solid Electrolyte Layer)

First, lithium-containing oxide glass as a solid electrolyte and an acrylic binder were mixed at a mass ratio of lithium-containing oxide glass:acrylic binder=70:30. Next, the resulting mixture was mixed with butyl acetate so that the solid content was 30 mass %, and the mixture was stirred together with ø5 mm zirconia balls for 4 hours to provide a paste for producing a solid electrolyte layer. Subsequently, the paste was applied onto a release film and dried at 80° C. for 10 minutes to produce a green sheet for producing a solid electrolyte layer as a solid electrolyte layer precursor. Next, the green sheet was cut into a rectangular shape together with the release film and then peeled off from the release film. A rectangular green sheet for producing a solid electrolyte layer was thus obtained.

(Production of Paste for Producing Positive Electrode Layer)

First, lithium cobaltate (LiCoO$_2$) having Dmax of a particle size distribution of 10 µm as a positive electrode active material and lithium-containing oxide glass as a solid electrolyte (and an inorganic binder) were mixed at a mass ratio of lithium cobaltate:lithium-containing oxide glass=75:25. Here, the particle size distribution was measured with a particle size analyzer (MT3300EXII-SDC manufactured by Microtrac Inc.), and the maximum particle diameter of this particle size distribution was defined as Dmax. Next, the resulting mixture and an acrylic binder were mixed at a mass ratio of mixture (lithium cobaltate+lithium-containing oxide glass):acrylic binder=70:30, and then this was mixed with butyl acetate so that the solid content was 30 mass %. Then, the resulting mixture was stirred together with ø5 mm zirconia balls for 4 hours to provide a paste for producing a positive electrode layer.

(Production of Paste for Producing Negative Electrode Layer)

First, a carbon powder as a negative electrode active material and lithium-containing oxide glass as a solid electrolyte (and an inorganic binder) were mixed at a mass ratio of carbon powder:lithium-containing oxide glass=70:30. Next, the resulting mixture and an acrylic binder were mixed at a mass ratio of mixture (carbon powder+lithium-containing oxide glass):acrylic binder=70:30, and then this was mixed with butyl acetate so that the solid content was 30 mass %. Then, the resulting mixture was stirred together with ø5 mm zirconia balls for 4 hours to provide a paste for producing a negative electrode layer.

(Production of Paste for Producing Positive Electrode Current Collector Layer)

First, a carbon powder as a conductive material and lithium-containing oxide glass as a solid electrolyte (and an inorganic binder) were mixed at a mass ratio of carbon powder:lithium-containing oxide glass=70:30. Next, the resulting mixture and an acrylic binder were mixed at a mass ratio of mixture (carbon powder+lithium-containing oxide glass):acrylic binder=70:30, and then this was mixed with butyl acetate so that the solid content was 30 mass %. Then, the resulting mixture was stirred together with ø5 mm zirconia balls for 4 hours to provide a paste for producing a positive electrode current collector layer.

(Production of Paste for Producing Exterior Material)

First, lithium-containing oxide glass and an alumina particle powder as a particle powder were mixed at a mass ratio of lithium-containing oxide glass:alumina particle powder=50:50. Next, the resulting mixture and an acrylic binder were mixed at a mass ratio of mixture (lithium-containing oxide glass+alumina particle powder):acrylic binder=70:30, and then this was mixed with butyl acetate so that the solid content was 30 mass %. Then, the resulting mixture was stirred together with ø5 mm zirconia balls for 4 hours to provide a paste for producing an exterior material.

(Production of Green Sheet for Producing Exterior Material)

First, a paste for producing an exterior material was obtained in the same manner as in the "Step of Producing Paste for Producing Exterior Material" section. Subsequently, the paste was applied onto a release film and dried at 80° C. for 10 minutes to produce a green sheet for producing an exterior material as an exterior material precursor. Next, the green sheet was cut into a rectangular shape together with the release film and then peeled off from the release film. A rectangular green sheet for producing an exterior material was thus obtained.

(Production of Green Sheet for Producing Intermediate Layer)

First, lithium-containing oxide glass as a solid electrolyte and an acrylic binder were mixed at a mass ratio of lithium-containing oxide glass:acrylic binder=70:30. Next, the resulting mixture was mixed with butyl acetate so that the solid content was 30 mass %, and the mixture was stirred together with ø5 mm zirconia balls for 4 hours to provide a paste for producing an intermediate layer. Subsequently, the paste was applied onto a release film and dried at 80° C. for 10 minutes to produce a green sheet for producing an intermediate layer as an intermediate layer precursor.

(Production of Battery Element)

Printing was performed on the main surface of the green sheet for producing an intermediate layer to form a current collecting paste layer. At this time, printing was performed such that the current collecting paste layer was longer than the positive electrode paste layer in the direction in which the terminal of the positive electrode was extended. Printing with the paste for producing an exterior material was performed so as to surround the current collecting paste layer. Next, printing is performed on the current collecting paste layer to form a positive electrode paste layer. Screen printing with the paste for producing a positive electrode layer was performed so that the positive electrode paste layer had a thickness of 13.5 μm so that a frame-shaped unapplied portion was formed along the four sides of the surface. At this time, a screen printing plate having a resin thickness of 3 μm was used. Printing with the paste for producing an exterior material was performed on the frame-shaped unapplied portion to form a positive electrode printed film.

Next, printing with a paste for producing a negative electrode layer was performed on the main surface of the green sheet for producing a solid electrolyte layer so that a U-shaped unapplied portion was formed along three sides of the surface, thereby forming a negative electrode paste layer. At this time, a screen printing plate having a resin thickness of 3 μm was used. Printing with the paste for producing an exterior material was performed on the U-shaped unapplied portion to form a green sheet for producing a negative electrode layer.

The supporting substrates of the green sheet for producing a positive electrode layer and the green sheet for producing a negative electrode layer were peeled off, and laminating is performed so that the surface of the positive electrode layer of the green sheet for producing a positive electrode layer and the surface of the electrolyte layer of the green sheet for producing a negative electrode layer were in contact with each other. Next, the green sheets for producing an intermediate layer were disposed, and then the green sheets for producing an exterior material were disposed on these green sheets for producing an intermediate layer, respectively. Thereafter, the laminate was temporarily pressure-bonded at 50° C. or higher, then the acrylic resin binder was burned at 250° C. or higher, and the lithium-containing oxide glass and the ceramic powder contained in the laminate were fired at 500° C. or lower. A battery element was thus obtained.

(Production of Terminal)

First, an Ag powder (manufactured by Daiken Chemical Co., Ltd.) as a conductive particle powder and oxide glass (Bi—B glass, manufactured by AGC Inc., ASF-1096) were mixed at a predetermined mass ratio. Next, the resulting mixture and an acrylic binder were mixed at a mass ratio of mixture (Ag powder+oxide glass):acrylic binder=70:30, and then this was mixed with terpineol so that the solid content was 50 mass %. Then, the resulting mixture was stirred together with ø5 mm zirconia balls for 4 hours to provide a conductive paste. Next, the conductive paste was applied onto a release film, and then the conductive paste was attached to the first end surface and the second end surface of the battery element and fired at 400° C. for 1 hour to form a positive electrode terminal and a negative electrode terminal. A target solid-state battery was thus obtained.

(Evaluation of Film Thickness of Outer Edge Portion of Electrode Layer)

For one battery for which battery characteristics were not evaluated, the electrodes were milled with an ion milling apparatus (ArBlade manufactured by Hitachi High-Technologies Corporation), sections of the outer edge portions of the positive electrode layer and the negative electrode layer were photographed with a scanning electron microscope (S-4700 manufactured by Hitachi, Ltd., acceleration voltage 3 kV, 1,000 times) as stitched images of the outer edge portions, and the thickest portions of the films were taken as the maximum film thicknesses of the outer edge portions.

(Evaluation of Film Thickness of Central Portion of Electrode Layer)

For one battery for which battery characteristics were not evaluated, the electrodes were milled with an ion milling apparatus (ArBlade manufactured by Hitachi High-Technologies Corporation), stitched images of sections of the central portions of the positive electrode layer and the negative electrode layer were photographed with a scanning electron microscope (S-4700 manufactured by Hitachi, Ltd., acceleration voltage 3 kV, 1,000 times), 20 points were taken at equal intervals from an end to the other end in the plane direction of each central portion, and the thicknesses at the 20 points were averaged to obtain an average thickness.

(Evaluation of Film Thickness of Solid Electrolyte Layer)

For one battery for which battery cell evaluation was not performed, the solid electrolyte layer was milled with an ion milling apparatus (ArBlade manufactured by Hitachi High-Technologies Corporation), a stitched image of a section of the electrolyte layer was photographed with a scanning electron microscope (S-4700 manufactured by Hitachi, Ltd., acceleration voltage 3 kV, 1,000 times), 20 points were taken at equal intervals from an end to the other end in the plane direction of the electrolyte layer, and the thicknesses at the 20 points were averaged to obtain an average thickness.

(Evaluation of Maximum Particle Size of Positive Electrode Active Material Particles Contained in Outer Edge Portion of Positive Electrode Layer)

For one battery for which battery characteristics were not evaluated, the positive electrode layer was milled with an ion milling apparatus (ArBlade manufactured by Hitachi High-Technologies Corporation), a stitched image of a section of the outer edge portion of the positive electrode was photographed with a scanning electron microscope (S-4700 manufactured by Hitachi, Ltd., acceleration voltage 3 kV), the longest part of each particle was taken as the particle size, and the largest value of the particle size was taken as the maximum particle size of the positive electrode active material particles. The maximum particle size of the positive electrode active material particles contained in the outer edge portion of the positive electrode layer was 10 μm.

(Evaluation of Internal Resistance of Battery)

Charging was performed under the following charging conditions, and the internal resistance was calculated by the following equation from a voltage change ΔV immediately after starting discharging under the following discharging conditions.

(Internal resistance)=ΔV/A

Measurement environmental condition: 23° C.
Charging conditions: CCCV 4.35 V, 0.05 C/0.01 C cut
Discharging conditions: CC 0.1 C, 2.0 V cut Next, the internal resistances of Examples 1 to 7 and Comparative Examples 2 and 3 were converted into relative values with the internal resistance of Comparative Example 1 being 100%. The results are shown in Table 1.

(Evaluation of Short-Circuiting Occurrence Rate)

A battery in which CV charging was not completed after 30 hours elapsed from the start of charging under the following charging conditions was defined as a shorted cell, and the short-circuiting occurrence rate was calculated by the following formula. The results are shown in Table 1.

(Short-circuiting occurrence rate)=(number of shorted cells)/(total number of cells)

Measurement environmental condition: 23° C.
Charging conditions: CCCV 4.35 V, 0.05 C/0.01 C cut

Example 2

A battery was produced in the same manner as in Example 1 except that the resin thickness of the screen printing plate at the time of applying the paste for producing a positive electrode layer was changed to 6 μm, that the resin thickness of the screen printing plate at the time of applying the paste for producing a negative electrode layer was changed to 6 μm, and that the maximum particle size of the positive electrode active material particles contained in the outer edge portions of the positive electrode layer was changed to 25 μm using lithium cobaltate having Dmax of the particle size distribution of 25 μm, and the battery characteristics were evaluated. The results are shown in Table 1.

Example 3

A battery was produced in the same manner as in Example 2 except that the resin thickness of the screen printing plate at the time of applying the paste for producing a positive electrode layer was changed to 14 μm, that the resin thickness of the screen printing plate at the time of applying the paste for producing a negative electrode layer was changed to 14 μm, and that the maximum particle size of the positive electrode active material particles contained in the outer edge portions of the positive electrode layer was changed to 23 μm, and the battery characteristics were evaluated. The results are shown in Table 1.

Example 4

A battery was produced in the same manner as in Example 3 except that the resin thickness of the screen printing plate at the time of applying the paste for producing a negative electrode layer was changed to 1 μm and that the maximum particle size of the positive electrode active material particles contained in the outer edge portions of the positive electrode layer was changed to 24 μm, and the battery characteristics were evaluated. The results are shown in Table 1.

Example 5

A battery was produced in the same manner as in Example 4 except that the resin thickness of the screen printing plate at the time of applying the paste for producing a positive electrode layer was changed to 1 μm and that the maximum particle size of the positive electrode active material particles contained in the outer edge portions of the positive electrode layer was changed to 25 μm, and the battery characteristics were evaluated. The results are shown in Table 1.

Example 6

A battery was produced in the same manner as in Example 4 except that the resin thickness of the screen printing plate at the time of applying the paste for producing a negative electrode layer was changed to 16 μm and that the maximum particle size of the positive electrode active material particles contained in the outer edge portions of the positive electrode layer was changed to 25 μm, and the battery characteristics were evaluated. The results are shown in Table 1.

Example 7

A battery was produced in the same manner as in Example 5 except that the resin thickness of the screen printing plate at the time of applying the paste for producing a positive electrode layer was changed to 16 μm and that the maximum particle size of the positive electrode active material particles contained in the outer edge portions of the positive electrode layer was changed to 24 μm, and the battery characteristics were evaluated. The results are shown in Table 1.

Comparative Example 1

A battery was produced in the same manner as in Example 1 except that the resin thickness of the screen printing plate at the time of applying the paste for producing a positive electrode layer was changed to 0 μm and that the resin thickness of the screen printing plate at the time of applying the paste for producing a negative electrode layer was changed to 0 μm, and the battery characteristics were evaluated. The results are shown in Table 1.

Comparative Example 2

A battery was produced in the same manner as in Example 1 except that the resin thickness of the screen printing plate at the time of applying the paste for producing a positive electrode layer was changed to 15 μm and that the resin thickness of the screen printing plate at the time of applying the paste for producing a negative electrode layer was changed to 16 μm, and the battery characteristics were evaluated. The results are shown in Table 1.

Comparative Example 3

A battery was produced in the same manner as in Example 1 except that the total thickness of the screen printing plate at the time of applying the paste for producing a positive electrode layer was changed to twice the thickness of the printing plate in Example 1 and that screen printing with the paste for producing a positive electrode layer was performed so that the positive electrode layer had a thickness of 18.5 μm, and the battery characteristics were evaluated. The results are shown in Table 1.

TABLE 1

|  | (Maximum film thickness of outer edge portion of positive electrode layer)/(average film thickness of central portion of positive electrode layer) | (Maximum film thickness of outer edge portion of negative electrode layer)/(average film thickness of central portion of negative electrode layer) | (Average film thickness of solid electrolyte layer)/ (average film thickness of central portion of positive electrode layer) | (Average film thickness of solid electrolyte layer)/ (average film thickness of central portion of negative electrode layer) | Numerical value 1 | Numerical value 2 | Internal resistance ratio with Comparative Example 1 being 100% (%) | Short-circuiting occurrence rate (%) |
|---|---|---|---|---|---|---|---|---|
| Example 1 | 1.07 | 1.07 | 0.37 | 0.5 | 4.1 | 4.3 | 65% | 0.00% |
| Example 2 | 1.15 | 1.15 | 0.37 | 0.5 | 3 | 3.5 | 71% | 0.00% |
| Example 3 | 1.32 | 1.33 | 0.37 | 0.5 | 0.7 | 1.7 | 71% | 6.70% |
| Example 4 | 1.32 | 1.03 | 0.37 | 0.5 | 0.7 | 4.7 | 65% | 6.70% |
| Example 5 | 1.03 | 1.33 | 0.37 | 0.5 | 4.6 | 1.7 | 59% | 13.30% |
| Example 6 | 1.32 | 1.36 | 0.37 | 0.5 | 0.7 | 1.4 | 71% | 13.30% |
| Example 7 | 1.36 | 1.33 | 0.37 | 0.5 | 0.1 | 1.7 | 71% | 13.30% |
| Comparative Example 1 | 1.02 | 1.02 | 0.37 | 0.5 | 4.7 | 4.8 | 100% | 0.00% |
| Comparative Example 2 | 1.36 | 1.38 | 0.37 | 0.5 | 0 | 1.2 | 59% | 53.30% |
| Comparative Example 3 | 1.07 | 1.07 | 0.27 | 0.27 | 3.7 | 4.3 | 59% | 93.30% |

Numerical value 1: (average film thickness of solid electrolyte layer) − {(maximum film thickness of outer edge portion of positive electrode layer) − (average film thickness of central portion of negative electrode layer)}
Numerical value 2: (average film thickness of solid electrolyte layer) − {(maximum film thickness of outer edge portion of negative electrode layer) − (average film thickness of central portion of positive electrode layer)}

In Examples 1 to 7, solid-state batteries having lower internal resistances and lower short-circuiting occurrence rates than those in Comparative Examples 1 to 3 were obtained.

The solid-state battery of the present invention can be used in various fields where use of a battery or storage of electricity is assumed. Although it is merely an example, the solid-state battery of the present invention can be used in the fields of electricity, information, and communication in which mobile devices and the like are used (such as the field of electric/electronic devices and the field of mobile devices including small electronic devices such as mobile phones, smartphones, notebook computers and digital cameras, activity trackers, arm computers, electronic paper, RFID tags, card-type electronic money, and smartwatches), home and small industrial applications (such as the fields of power tools, golf carts, and home, nursing, and industrial robots), large industrial applications (such as the fields of forklifts, elevators, and harbor cranes), the field of transportation systems (such as the fields of hybrid vehicles, electric vehicles, buses, trains, power-assisted bicycles, and electric two-wheeled vehicles), power system applications (such as the fields of various types of power generation, road conditioners, smart grids, and home energy storage systems), medical applications (field of medical equipment such as earphone hearing aids), pharmaceutical applications (fields such as dosage management systems), IoT fields, space and deep sea applications (such as the fields of space probes and submersibles), and the like.

DESCRIPTION OF REFERENCE SYMBOLS

1: Battery element
1A: First end surface
1B: Second end surface
1C: Peripheral surface
2: First external electrode
3: Second external electrode
4: Positive electrode layer
4A: Central portion
4B: Outer edge portion
4C: Central portion
4D: Outer edge portion
5: Negative electrode layer
5A: Central portion
5B: Outer edge portion
5C: Central portion
5D: Outer edge portion
6: Solid electrolyte
7: Current collector layer
7D: Projecting portion of current collector layer
8: Intermediate layer
9: Intermediate layer
10A: Exterior material
10B: Exterior material
10C: Exterior material
10D: Exterior material
11: Battery element
21: Battery element
U1: Battery constituent unit

The invention claimed is:

1. A solid-state battery comprising:
one or more battery constituent units each including a positive electrode layer, a negative electrode layer, and a solid electrolyte layer interposed between the positive electrode layer and the negative electrode layer,
wherein the positive electrode layer and the negative electrode layer have a central portion and an outer edge portion surrounding the central portion in a plan view of the solid-state battery, and
wherein, in at least one of the positive electrode layer and the negative electrode layer:

1.05≤(maximum value of film thickness of outer edge portion)/(average film thickness of central portion)<1.34; and (average film thickness of solid electrolyte layer)/ (average film thickness of central portion)>0.35.

2. The solid-state battery according to claim 1, wherein, in the at least one of the positive electrode layer and the negative electrode layer:

(average film thickness of solid electrolyte layer)−
{(maximum value of film thickness of outer edge portion)−(average film thickness of central portion)}>0.

3. The solid-state battery according to claim 1, wherein, in both of the positive electrode layer and the negative electrode layer:

1.05≤(maximum value of film thickness of outer edge portion)/(average film thickness of central portion)<1.34.

4. The solid-state battery according to claim 1, wherein, in both of the positive electrode layer and the negative electrode layer:

1.05≤(maximum value of film thickness of outer edge portion)/(average film thickness of central portion)<1.20.

5. The solid-state battery according to claim 1, wherein a ratio a/L is in a range of 0.03 to 0.3, wherein L is a length of the at least one of the positive electrode layer and the negative electrode layer, and a is a width of the outer edge portion.

6. The solid-state battery according to claim 1, wherein a ratio a/L is in a range of 0.1 to 0.3, wherein L is a length of the at least one of the positive electrode layer and the negative electrode layer, and a is a width of the outer edge portion.

7. The solid-state battery according to claim 1, wherein, the at least one of the positive electrode layer and the negative electrode layer is the positive electrode layer.

8. The solid-state battery according to claim 1, wherein, the at least one of the positive electrode layer and the negative electrode layer is the negative electrode layer.

9. The solid-state battery according to claim 1, wherein, in the solid electrolyte layer:

0.9≤(average film thickness of solid electrolyte layer)/(average film thickness of central portion) ≤1.1.

10. The solid-state battery according to claim 1, wherein the outer edge portion of the at least one of the positive electrode layer and the negative electrode layer protrudes toward the solid electrolyte layer with respect to the central portion.

11. The solid-state battery according to claim 10, wherein the outer edge portion of the at least one of the positive electrode layer and the negative electrode layer protrudes opposite to the solid electrolyte layer with respect to the central portion.

12. The solid-state battery according to claim 11, wherein a ratio a/L is in a range of 0.03 to 0.3, wherein L is a length of the at least one of the positive electrode layer and the negative electrode layer, and a is a width of the outer edge portion.

13. The solid-state battery according to claim 11, wherein a ratio a/L is in a range of 0.1 to 0.3, wherein L is a length of the at least one of the positive electrode layer and the negative electrode layer, and a is a width of the outer edge portion.

* * * * *